United States Patent [19]

Flaming

[11] Patent Number: 4,913,719
[45] Date of Patent: Apr. 3, 1990

[54] METHOD AND APPARATUS FOR FORMING MICROPIPETTE OF CONTROLLED CONFIGURATION BY SELECTING THE PATTERN OF HEAT APPLICATION

[76] Inventor: Dale G. Flaming, 2165-G Francisco Blvd., San Rafael, Calif. 94901

[21] Appl. No.: 377,045

[22] Filed: Jul. 10, 1989

Related U.S. Application Data

[63] Continuation-in-part of Ser. No. 342,177, Apr. 24, 1989, Pat. No. 4,869,745.

[51] Int. Cl.$^4$ .............................................. C03B 23/11
[52] U.S. Cl. ........................................ 65/105; 65/108; 65/112; 65/270; 65/283
[58] Field of Search ................. 65/102, 105, 112, 270, 65/283, 108, 271

[56] References Cited

U.S. PATENT DOCUMENTS

| | | | |
|---|---|---|---|
| 3,839,005 | 10/1974 | Meyer | 65/112 |
| 4,045,201 | 8/1977 | Caffarella et al. | 65/105 |
| 4,146,380 | 3/1979 | Caffarella et al. | 65/270 X |
| 4,600,424 | 7/1986 | Flaming | 65/108 X |
| 4,631,079 | 12/1986 | Clark et al. | 65/108 X |

Primary Examiner—Arthur Kellogg
Attorney, Agent, or Firm—Melvin R. Stidham

[57] ABSTRACT

A micropipette puller of this invention includes a pair of gripping jaws that pull a length of glass tubing in opposite directions. The source of heat is a laser and a beam is directed into a zoom lens, or a selected one of a series of lenses, so that a beam of selected length and configuration is refracted against the glass tubing between the gripping jaws.

4 Claims, 1 Drawing Sheet

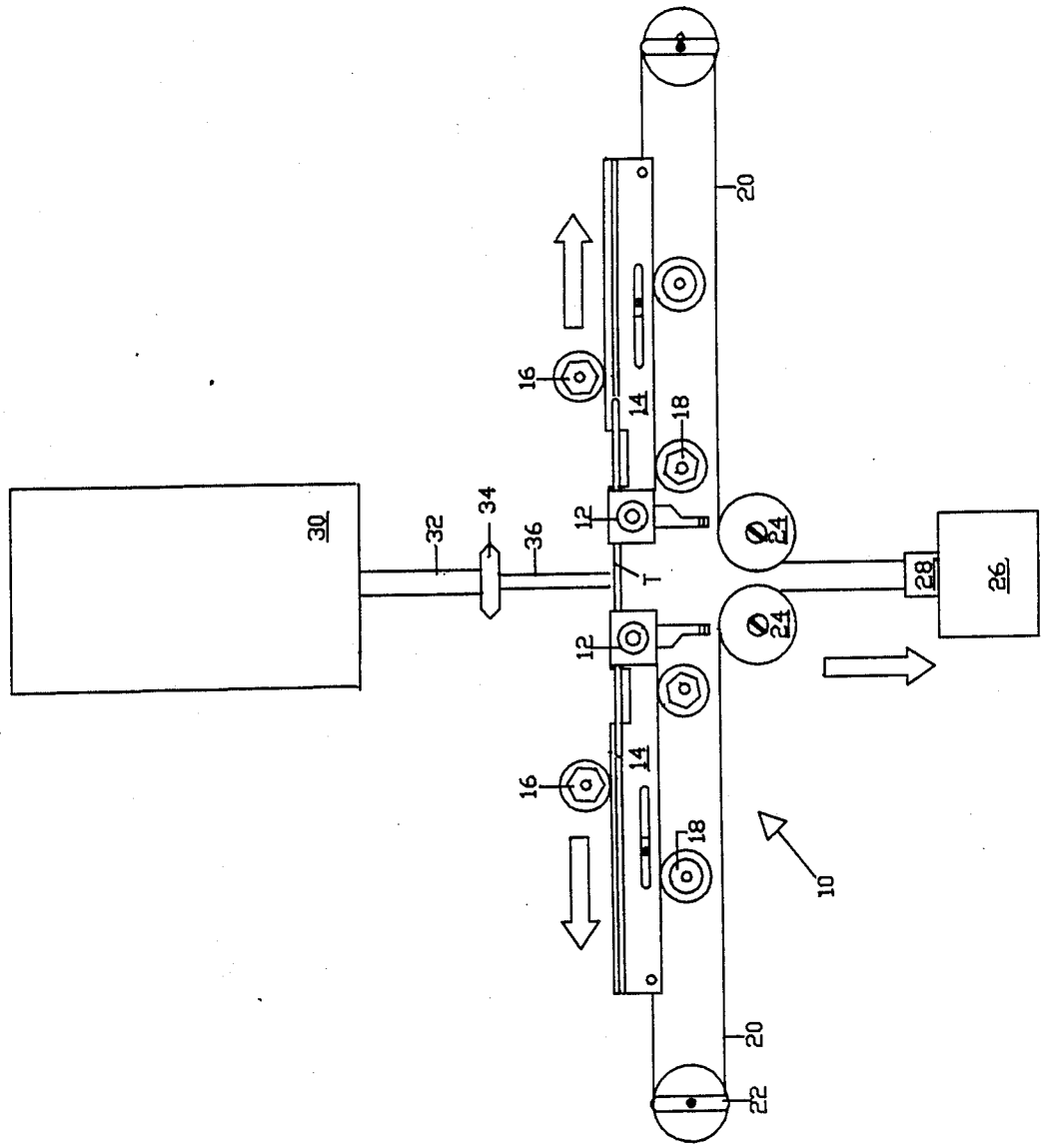

METHOD AND APPARATUS FOR FORMING MICROPIPETTE OF CONTROLLED CONFIGURATION BY SELECTING THE PATTERN OF HEAT APPLICATION

This is a continuation-in-part of my application Ser. No. 07/342,177 filed Apr. 24, 1989 now patent No. 4,869,745 for "Apparatus for Forming Micropipette of Controlled Configuration by Moving the Point of Heat Application".

BACKGROUND OF THE INVENTION

This invention relates to micropipette pullers of the type shown in my earlier U.S. Pat. No. 4,600,424 granted July 15, 1986. Micropipette pullers generally employ a filament comprising a heated metal band or wire bent into a ring to surround the glass tubing and heat it to its melting point. The shape of the micropipette is dependent largely upon the shape of the filament and various types of filaments are available for the production of different shapes and lengths of micropipettes. However, a change in the shape and type of filament often produces a significant change in the heating characteristic, and the shape of the micropipette is difficult to control and replicate.

The better micropipette pullers are now all computerized so that the variables in the pulling process, such as filament temperature, length of the pull, the strength of the pull and the rate at which the glass is cooled may be programmed into the puller. Efforts have also been made to move the filament during the pulling cycle in order to heat a greater area, but the movement of the filament was very difficult to program in a repeatable manner.

OBJECTS OF THE INVENTION

It is an object of this invention to provide a micropipette puller with means for applying heat to the glass tubing in a controlled and repeatable pattern.

It is a further object of this invention to provide a micropipette puller capable of pulling a micropipette of controlled configuration from materials of high melting point, such as quartz.

Other objects and advantages of this invention will become apparent from the description to follow, particularly when read in conjunction with the accompanying drawing.

SUMMARY OF THE INVENTION

In carrying out this invention, a tubing of glass, quartz or the like is pulled from both ends, initially by a weight carried on the ends of cables and then by a solenoid. A laser directs a laser beam into a zoom, or a shuttle assembly of a series of different fixed lenses from which a beam of selected length and configuration is directed against the glass tubing so as to heat a predetermined length of the tubing and thereby control the taper and length of the micropipette being pulled.

BRIEF DESCRIPTION OF THE DRAWING

The drawing is a schematic diagram of the apparatus of this invention for pulling a micropipette.

DESCRIPTION OF A PREFERRED EMBODIMENT

Referring now to the drawing with greater particularity, the micropipette puller 10 of this invention includes a pair of gripping jaws 12 on the adjacent ends of puller bars 14. The jaws 12 grip a tubing T of glass, quartz or the like to be pulled, as heat is applied to the tubing to melt a portion thereof between the jaws, and form a micropipette.

The puller bars 14 roll along upper and lower roller bearings 16 and 18 and are pulled by cables 20 which extend over upper cable pulleys 22 and then over closely spaced central lower pulleys 24 to suspend a solenoid 26, which is capable of applying a light pull by application of its own weight, and a stronger pull by actuation of the solenoid plunger 28. The source of heat in the micropipette puller 10 is a laser device 30 that projects a generally vertical beam 32 into a selected lens system 34, which is, positioned to refract the beam at 36 against the glass tubing T.

The lens system 34 is a zoom lens, or it may be a shuttle assembly of different fixed lenses. In other cases, the laser beam 36 refracted therefrom is of a selected variable length, to focus the heat on just a desired length of the glass tubing T, thereby to limit the length of the heated portion of the tubing and to control the length and taper of the micropipette being pulled. The zoom lens setting or a particular sequence of repeated selected, fixed lenses can be repeated again and again for multiple production of micropipettes of a desired configuration.

The laser device 30 is not limited by its own melting point as in the case of a filament heater and it can melt materials of high melting point, such as quartz, which resonates at the wave length of a laser beam.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A micropipette puller comprising:
   a pair of gripping members for gripping a length of glass tubing at spaced points along the length thereof;
   means for applying pulling forces to separate said gripping means;
   a laser device for directing a laser beam; and
   a lens system capable of transmitting therefrom a beam of selected size and configuration, said lens being disposed to refract said laser beam against a predetermined length of said tubing between said spaced points.

2. The micropopette puller defined by claim 1 wherein:
   said lens system is of the zoom type.

3. The method of pulling micropipettes comprising the steps of:
   providing means for gripping a length of glass tubing at spaced points along the length thereof and applying forces to pull said gripping means apart;
   providing a laser device for directing a laser beam;
   providing an assembly of a plurality of lenses, each capable of refracting a laser beam therefrom of a selected length; and
   positioning said assembly so that a selected one of said lenses receives a laser beam from said laser device and refracts it against a predetermined length of said tubing.

4. The method of pulling micropipettes comprising the steps of:

providing means for gripping a length of glass tubing at spaced points along the length thereof and applying forces to pull said gripping means apart;

providing a laser device for directing a laser beam;

providing a zoom lens device capable of refracting a laser beam therefrom of a selected length; and positioning said zoom lens to receive a laser beam from said laser device and refract it against a predetermined length of said tubing.

* * * * *